(12) United States Patent
Gupta

(10) Patent No.: US 10,372,723 B2
(45) Date of Patent: *Aug. 6, 2019

(54) EFFICIENT QUERY PROCESSING USING HISTOGRAMS IN A COLUMNAR DATABASE

(71) Applicant: Amazon Technologies, Inc., Seattle, WA (US)

(72) Inventor: Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,511

(22) Filed: Sep. 15, 2017

(65) Prior Publication Data

US 2018/0025065 A1 Jan. 25, 2018

Related U.S. Application Data

(63) Continuation of application No. 15/050,104, filed on Feb. 22, 2016, now Pat. No. 9,767,174, which is a (Continued)

(51) Int. Cl.
*G06F 17/30* (2006.01)
*G06F 16/25* (2019.01)
(Continued)

(52) U.S. Cl.
CPC .......... *G06F 16/254* (2019.01); *G06F 16/221* (2019.01); *G06F 16/2237* (2019.01);
(Continued)

(58) Field of Classification Search
None
See application file for complete search history.

(56) References Cited

U.S. PATENT DOCUMENTS 5,761,652 A 6/1998 Wu et al.
6,226,629 B1 5/2001 Cossrock
(Continued)

FOREIGN PATENT DOCUMENTS

CN 1639688 7/2005
CN 101826098 9/2010
CN 102609439 7/2012

OTHER PUBLICATIONS

Office Action Chinese Application No. 201480013906.5, dated Jan. 11, 2018 (English Translation and Chinese Version) Amazon Technologies, Inc., pp. 1-24.
(Continued)

*Primary Examiner* — Debbie M Le
(74) *Attorney, Agent, or Firm* — Robert C. Kowert; Meyertons, Hood, Kivlin, Kowert & Goetzel, P.C.

(57) ABSTRACT

A probabilistic data structure is generated for efficient query processing using a histogram for unsorted data in a column of a columnar database. A bucket range size is determined for multiples buckets of a histogram of a column in a columnar database table. In at least some embodiments, the histogram may be a height-balanced histogram. A probabilistic data structure is generated to indicate for which particular buckets in the histogram there is a data value stored in the data block. When an indication of a query directed to the column for select data is received, the probabilistic data structure for each of the data blocks storing data for the column may be examined to determine particular ones of the data blocks which do not need to be read in order to service the query for the select data.

20 Claims, 10 Drawing Sheets

Related U.S. Application Data continuation of application No. 14/611,939, filed on Feb. 2, 2015, now Pat. No. 9,268,838, which is a continuation of application No. 13/742,287, filed on Jan. 15, 2013, now Pat. No. 8,949,224.

(51) Int. Cl.
  *G06F 16/22* (2019.01)
  *G06F 16/245* (2019.01)
  *G06F 16/28* (2019.01)
  *G06F 16/2455* (2019.01)
  *G06F 16/27* (2019.01)

(52) U.S. Cl.
  CPC ...... *G06F 16/245* (2019.01); *G06F 16/24554* (2019.01); *G06F 16/278* (2019.01); *G06F 16/283* (2019.01)

(56) References Cited

U.S. PATENT DOCUMENTS

| | | |
|---|---|---|
| 6,278,989 B1 | 8/2001 | Chaudhuri et al. |
| 6,460,045 B1 | 10/2002 | Aboulnaga et al. |
| 6,691,091 B1 | 2/2004 | Cerisara et al. |
| 6,691,099 B1 | 2/2004 | Mozes |
| 6,732,985 B1 | 5/2004 | Cantrell |
| 7,424,498 B1 | 9/2008 | Patterson |
| 7,512,754 B1* | 3/2009 | Chaitanya ............ G06F 3/0605 711/154 |
| 7,774,163 B2 | 8/2010 | Popivanov |
| 7,991,763 B2* | 8/2011 | Bestgen ............ G06F 17/30964 707/610 |
| 8,229,917 B1 | 7/2012 | Aneas et al. |
| 8,290,972 B1 | 10/2012 | Deshmukh et al. |
| 8,316,009 B2 | 11/2012 | Fraser et al. |
| 8,392,406 B1 | 3/2013 | Emekci et al. |
| 8,832,142 B2 | 9/2014 | Marwah et al. |
| 8,949,224 B2 | 2/2015 | Gupta |
| 9,268,838 B2 | 2/2016 | Gupta |
| 9,767,174 B2 | 9/2017 | Gupta |
| 2003/0149679 A1 | 8/2003 | Na et al. |
| 2005/0144234 A1 | 6/2005 | Tanaka et al. |
| 2007/0021998 A1 | 1/2007 | Laithwaite et al. |
| 2007/0078808 A1 | 4/2007 | Haas et al. |
| 2008/0228709 A1 | 9/2008 | Muras et al. |
| 2008/0288444 A1 | 11/2008 | Edwards et al. |
| 2012/0102377 A1 | 4/2012 | Viswanathan et al. |
| 2012/0131591 A1 | 5/2012 | Moorthi et al. |
| 2014/0095472 A1 | 4/2014 | Lee et al. |
| 2015/0269205 A1* | 9/2015 | Ma ................... G06F 17/30306 707/614 |

OTHER PUBLICATIONS

Preliminary Rejection from Korean Patent Application No. 10-2017-7030855, dated Nov. 20, 2017, Amazon Technologies, Inc., pp. 1-7.
Dominik Slezak, et al., "Brighthouse: An Analytic data Warehouse for Ad-hoc Queries", ACM, Proceedings of the VLDB Endowment, vol. 1, Issue 2, Aug. 2008, pp. 1337-1345.
Tim Hall,"Site Info", Oracle-Base , Accessed May 22, 2014, pp. 1-2.
Leverenz et al., "Concepts", Oracle8, Dec. 1997, pp. 1-18.
International Search Report and Written Opinion from PCT/US2014/011686, dated Jun. 10, 2014, Amazon Technologies, Inc., pp. 1-20.
Robert Gaydos, "Understanding Histograms in the Oracle Database", R Wave Solutions, 2008, Available at www.rwavesolutions.com/tips.php, pp. 1-28.
Chinese Office Action from Application No. 201480008818.6, dated Dec. 26, 2016, Amazon Technologies, Inc., pp. 1-11.
Japanese Office Action from Patent Application No. 2015-553801, dated Jun. 21, 2016 (English Translation—Japanese Version), pp. 1-7.
Yoshinori Matsunobu, "To consider what 'columnar database' suitable to data warehousing purposes is in the case of My SQL Infini DB", DB Magazine, Shoei-sha Co., Ltd., Aug. 1, 2010, vol. 20, No. 4, pp. 106-114.
Extended European Search Report from Application No. 14740238.2, dated Aug. 4, 2016, Amazon Technologies, Inc., pp. 1-5.

* cited by examiner

EFFICIENT QUERY PROCESSING USING HISTOGRAMS IN A COLUMNAR DATABASE

This application is a continuation of U.S. patent application Ser. No. 15/050,104, filed Feb. 22, 2016, now U.S. Pat. No. 9,767,174, which is a continuation of U.S. patent application Ser. No. 14/611,939, filed Feb. 2, 2015, now U.S. Pat. No. 9,268,838, which is a continuation of U.S. patent application Ser. No. 13/742,287, filed Jan. 15, 2013, now U.S. Pat. No. 8,949,224, which are hereby incorporated by reference in their entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

One such technology involves modifying the orientation or arrangement of data as it is stored in a database table using a column oriented database table (often referred to as "columnar") to reduce the number of access operations required to manage it. Typically, access operations, such as various inputs (e.g., writing data) and output (e.g., reading data), prove to be the most costly and least efficient when storing and managing data. Columnar databases may for certain types of data drastically reduce the number of access operations, when, for instance, the database system is responding to a query for information that occurs predominately in a column of a database table rather than a row of a database table. Yet, even with the advent of technologies such as columnar database tables, the continued growth of collected information requires further optimizations for the storage and management of data.

Figure 1:
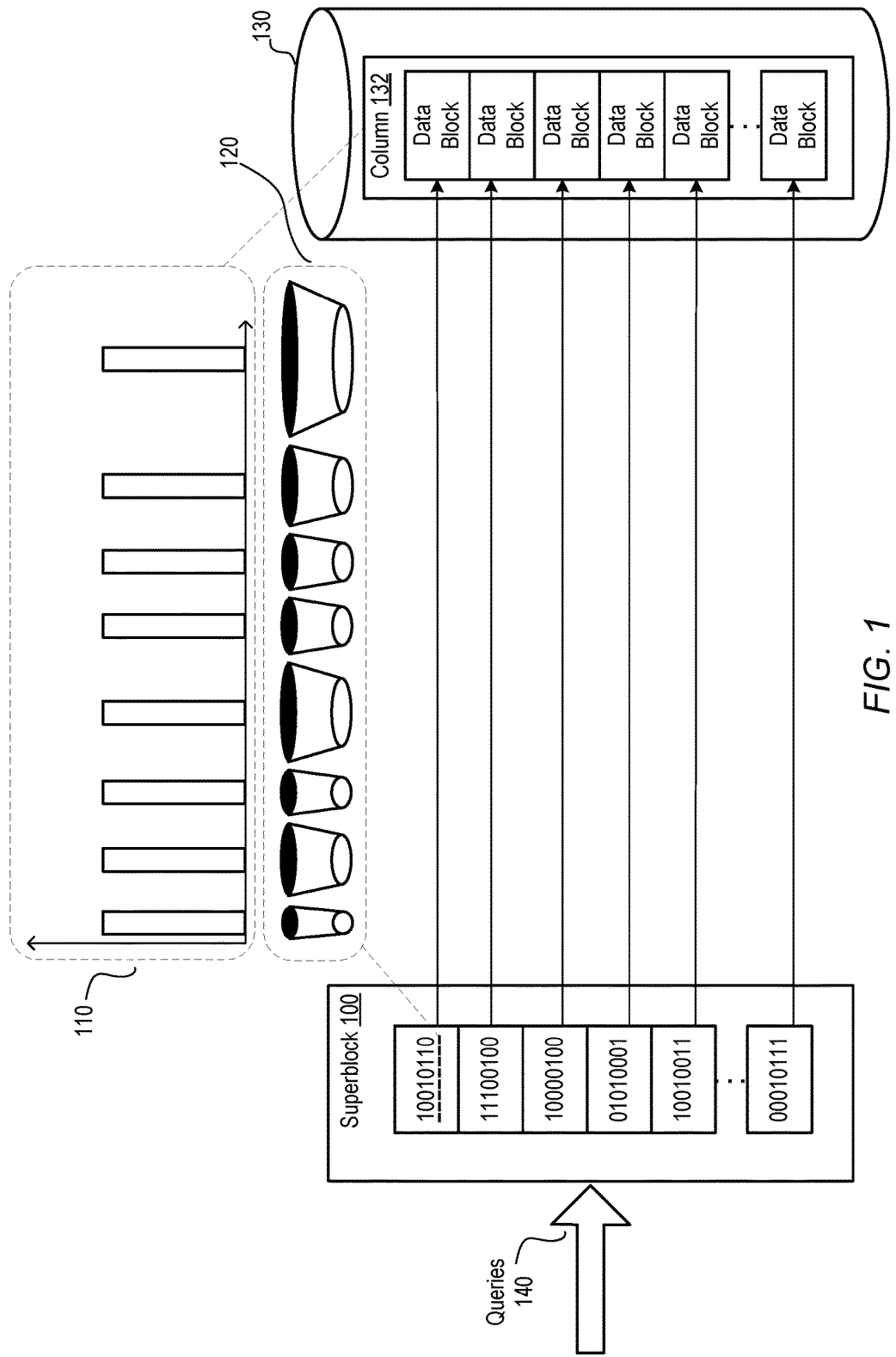
FIG. 1 illustrates a dataflow block diagram of efficient query processing using a height-balanced histogram for a column of a columnar database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of efficient query processing using a histogram for a column of a columnar database are described herein. A database management service, such as a distributed data warehouse system, or other database management system may implement column oriented database tables (hereinafter referred to as "columnar database tables") to provide efficient data management for clients. Typically, data in the columnar database table is sorted according to one column of the database table, such as by date. When determining whether or not blocks sorting data for the column along which the data is sorted, different ranges for each data block may be stored or estimated, allowing for queries to only direct the reading of data blocks with the requested data known to be likely stored in the data block. However, such a technique may only be applied when responding to queries for data in the column along which the columnar database table is sorted, as only one column may be sorted at a time.

A histogram represents the distribution of a data set within different ranges of values, which are often referred to as buckets. For example, a histogram of weather temperatures might illustrate a bar graph that shows the number of days where the high temperature was in the 90s, 80s, 70s, and so on. The height of the bars in the bar graph representing the histogram may vary greatly as some ranges of values may have more frequent values in the data set. A height-balanced histogram, however, provides differing sizes of the ranges of values (i.e., the buckets) such that the height of the bars of a plotted histogram would be even or balanced. A column of a columnar database table may contain data values of varying frequency. A histogram generated based on these data values may be used to identify a different ranges of values stored in a data block, and thus determine which blocks do not need to be read. In at least some embodiments, a height-balanced histogram generated based on these data values may provide sufficient selectivity (e.g., discrimination or probability of a data value in a particular bucket) to process queries, such that when a query is received the height-balanced histogram of the column may be used to determine which data blocks storing data for the column do not need to be read. Less read operations (or other various access operations) may, for example, then be executed to obtain data to service a received query. Thus, by using a histogram or a height-balanced histogram for a column of a columnar database to process queries, some embodiments may provide more efficient management of and access to large amounts of data.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

A data management service, such as a distributed data warehouse service discussed below with regard to FIGS. 2 through 4B, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, the column field values for many more rows may be retrieved than if each data block stored an entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar database table, a histogram for a column of a columnar database may be generated to create probabilistic data structures that are used to determine data blocks that do not need to be read when responding to a query.

FIG. 1 illustrates a dataflow block diagram of efficient query processing using a height-balanced histogram for a column of a columnar database, according to some embodiments. A height-balanced histogram 110 may be created based on the data values stored in multiple data blocks in a column 132 of a columnar database table. The bucket range sizes of the histogram 110 may be determined such that the data values are evenly distributed among the buckets 120 of the histogram. A probabilistic data structure may be created which indicates for which particular buckets of the buckets 110 in the height-balanced histogram 110 there is a data value stored in the data block. Stated more generally, a probabilistic data structure may be used to test whether a given value is a member of a data set, such as a set of data values stored in a data block. The probabilistic data structure may indicate with certainty that a particular value is not a member of a set of data values. In order to service queries 140 directed to the column 132 for select data, the respective entries in the superblock data structure 100 may be examined to determine which blocks do not need to be read.

Storage 130 may be one or more storage devices, such as storage disk devices or other type of storage devices configured to store data for a columnar database table. In FIG. 1, storage 130 is configured to store data for multiple columns, including column 132. Data may, for instance, be a list of dates, cites, quantities, or web metrics and, more generally, any other type or form of data value capable of storage in a data block for a column of a columnar database table. In various embodiments, the data values stored in a column are unsorted. A data block may be a unit of data storage (e.g., a data page), a logical abstraction, or physical block of storage that stores these data values in a database or other storage system. A columnar database table may be a column-oriented storage system for data configured to store data values of a column together. In at least some embodiments, storage 130 may be distributed across multiple different nodes in a distributed database system.

A histogram 110 may be generated based on the data values of the data blocks stored in the column 132. To determine the bucket range sizes of the buckets 120, data of the column from the data blocks may be obtained. Then multiple buckets may be generated, which may be significantly more than the number of values that may be stored in the data block. A bucket range size may be set for the buckets such that the data of the column is evenly distributed among the buckets. FIG. 1 illustrates the varying bucket 120 range sizes. For example, a retailer may store demographic information, such as age, about customers who purchase goods from the retailer over a certain period of time in a column of a columnar database table. If the ages of customers were highly concentrated at a certain age range (e.g., 45 to 60 years old) with the rest of customer ages more spread out, a histogram with even bucket size ranges (e.g., 10 years) might have 2 buckets, 40-50 and 50-60 with high numbers and the other buckets with much smaller numbers of customers. Instead, the bucket range sizes may be varied in bucket range size, such that some bucket ranges may contain ages 0-25, while others may be smaller 45-47, such that the number of customers represented in each bucket is evenly distributed across all of the buckets.

Probabilistic data structures may be generated for each data block based on the bucket range sizes 120. These probabilistic data structures indicate for which buckets of the buckets 120 a data value is within the range of values represented by the bucket and stored within a data block. In some embodiments, as FIG. 1 illustrates, probabilistic data structures may be stored as bitmaps. Each bit of the bitmap may correspond to a bucket of the histogram. Set bits indicate that a data value within the range of the bucket is stored within the data block. Thus if, for example, a query is being processed and the bitmap is examined for certain data values, if the bit of the bitmap representing a bucket that contains the data value sought in the query is set, then it is possible that the data value may be stored in the data block. If not, then the data block may not need to be read. Although illustrated as a height-balanced histogram 110, in at least some embodiments a non-height-balanced histogram may be used to generate the probabilistic data structures.

Probabilistic data structures may be stored in a block metadata data structure, such as superblock data structure 100, which stores information about the data blocks in the column. Each data block may have a respective entry in the superblock data structure 100. In some embodiments, as new data for a column is received, new probabilistic data structures may be generated to indicate which buckets have data values stored in the data block that are within the bucket range. In at least some embodiments, a rebalancing event, such as a certain threshold of new data added to a column, or a certain amount of time has passed since the creation of the histogram, may be detected. In some embodiments, a certain amount of skew in additional data to be stored for the column may also trigger a rebalancing event. The bucket range sizes may be modified, and the probabilistic data structures, such as those stored in the superblock data structure may be updated. As the modified probabilistic data structures are used in service of future queries directed to the column, false positives (i.e., when the probabilistic data structure indicates that a data value is stored within a range of the bucket size, but in fact the data block does not store a value within the range of the bucket size) may be corrected by updating the probabilistic data structure to more accurately reflect the data values stored in the data block. In some embodiments, a new superblock data structure may be created to be used for servicing queries, replacing a current superblock data structure so that query processing may not be interrupted when updating probabilistic data structures.

Embodiments of efficient query processing using a histogram for a column of a columnar database may be implemented in a variety of different database management systems. Data management services, such as distributed data warehouse services or other database services offered to clients, may implement query processing using a histogram for a column of a columnar database for client data stored with the data management service. Similarly client owned, operated, or controlled database systems may also implement histograms for query processing of columns. More generally, any system that stores data in a columnar database table may implement various embodiments of efficient query processing using a histogram for a column of a columnar database, and thus, the previous examples need not be limiting as to various other systems envisioned.

Figure 2:
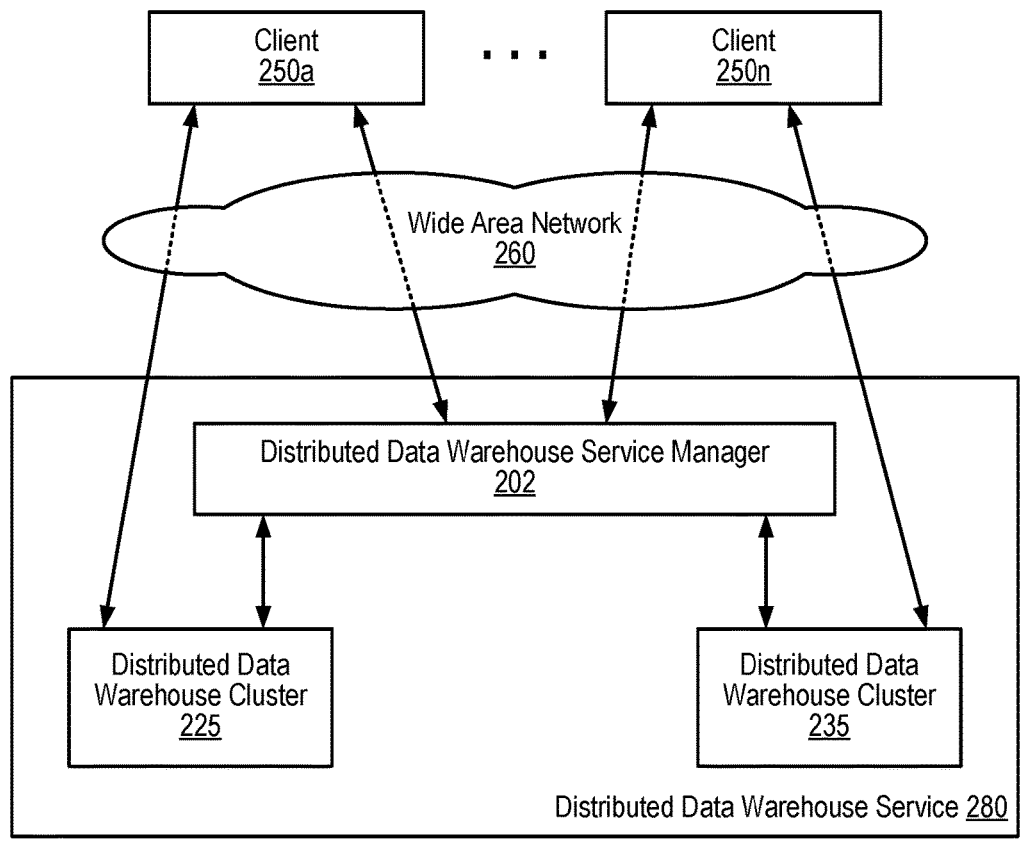
FIG. 2 is a block diagram illustrating an example distributed database warehouse service, according to some embodiments.

Implementing Histograms for Query Processing in a Distributed Data Warehouse Service As discussed above, various clients (or customers, organizations, entities, or users) may wish to store and manage data using a data management service. FIG. 2 illustrates an example distributed data warehouse system that may provide data management services to clients, according to some embodiments. Specifically, data warehouse clusters may respond to store requests (e.g., to write data into storage) or queries for data (e.g., such as a Server Query Language request (SQL) for select data), along with many other data management or storage services.

Multiple users or clients may access a data warehouse cluster to obtain data warehouse services. Clients which may include users, client applications, and/or data warehouse service subscribers), according to some embodiments. In this example, each of the clients 250*a* through 250*n* is able to access data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 11, configured to send requests to the data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the storage clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple storage clients (or users of a particular storage client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 11. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4B. Clusters may be configured to receive requests and other communications over WAN 260 from storage clients, such as clients 250a through 250n. A cluster may be configured to receive requests from multiple clients via the network endpoint of the cluster.

In some embodiments, distributed data warehouse service 280 may be implemented as part of a web service that allows users to set up, operate, and scale a data warehouse in a cloud computing environment. The data warehouse clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 11. Different subsets of these computing devices may be controlled by distributed data warehouse service manager 202. Distributed data warehouse service manager 202, for example, may provide a cluster control interface to clients, such as clients 250a through 250n, or any other clients or users who wish to interact with the distributed data warehouse clusters managed by the distributed data warehouse manager 202, which in this example illustration would be data warehouse clusters 225 and 235. For example, distributed data warehouse service manager 202 may generate one or more graphical user interfaces (GUIs) for storage clients, which may then be utilized to select various control functions offered by the control interface for the data warehouse clusters hosted in the distributed data warehouse service 280.

Figure 3:
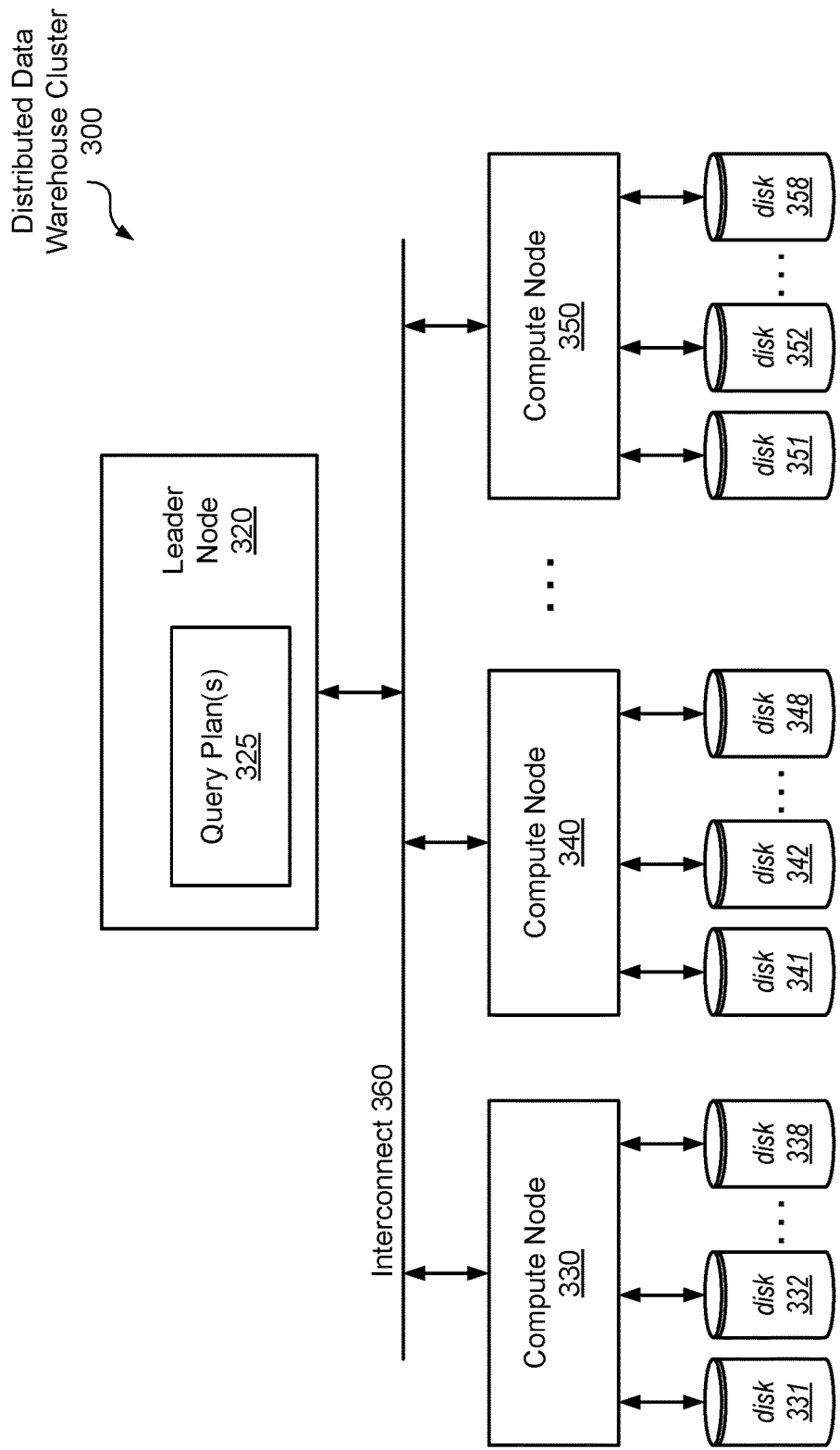
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as storage clients 250*a* through 250*n* discussed above with regard to FIG. 2. For example, a leader node may be a server that receives requests from various storage client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Figure 4B:
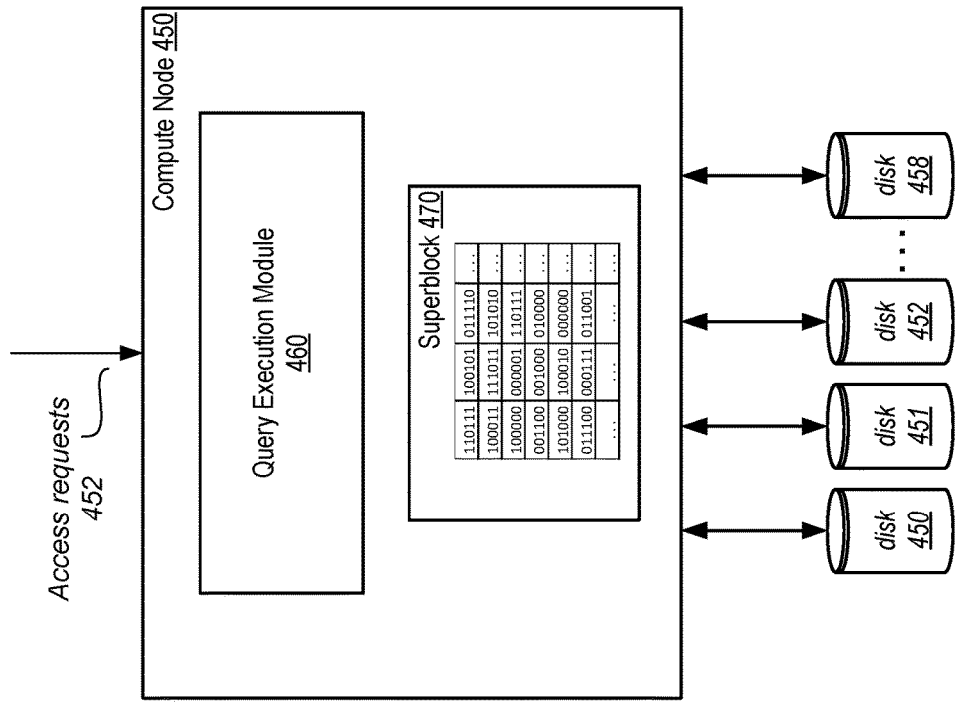
FIG. 4B is a block diagram illustrating an example compute node, according to some embodiments.

Distributed data warehousing cluster 300 may also include compute nodes, such as compute nodes 330, 340, and 350. These one or more compute nodes, may for example, be implemented on servers or other computing devices, such as those described below with regard to computer system 1000 in FIG. 11, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space, such as illustrated in FIG. 4B, in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Figure 4A:
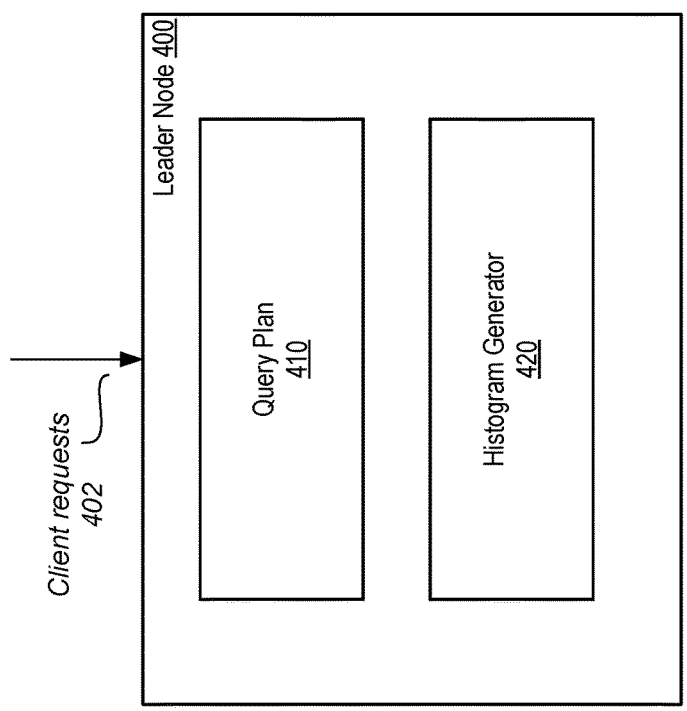
FIG. 4A is a block diagram illustrating an example leader node, according to some embodiments.

FIG. 4A illustrates an example leader node, according to some embodiments. As discussed above, leader node 400 may interact with various clients in a distributed data warehouse system receiving various messages and queries to manage and store additional data in a columnar database table. In addition to developing query plans 410 to carry out the associated database operation, a leader node may, in some embodiments, also include a histogram generator 420. Various different hardware and software devices may be used singly or in combination to implement histogram generator 420. Histogram generator 420 may be configured to determine bucket range sizes for a height-balanced histogram representing a distribution of data among multiple buckets in a column of the columnar database table. Histogram generator 420 may generate different histograms used for query processing, such as height-balanced histograms. In some embodiments, the data for a column of a columnar database table may be physically stored on many different compute nodes, such as compute node 450 illustrated in FIG. 4B. Histogram generator 420, therefore, may obtain as input the data from the different compute nodes for a column, generate the buckets for a histogram of the data in the column, and set a bucket range size for each of the buckets such that the data is evenly distributed among the buckets. Histogram generator 420 may also generate a probabilistic data structure for each data block of one or more data blocks storing data for the column based on the buckets of the histogram for the data in the column. A probabilistic data structure, as discussed above, indicates whether a given value is likely within a set of values, such as the data values stored in the data block. Thus, when based on the histogram, such as a height-balanced histogram, for the data in the column, the probabilistic data structure may indicate for which buckets of the multiple buckets of the histogram there is a data value in the bucket range size stored in the data block.

Histogram generator 420 may also determine when a histogram for a given column is to be regenerated, including generating new probabilistic data structures for the data blocks in the column. In some embodiments, a rebalancing event may be detected for a height-balanced histogram, such as when the time elapsed since the height-balanced histogram for the column was last generated, or when a certain amount of new data has been stored in the column. The histogram generator 420 may be configured, in at least some embodiments, to modify the bucket size ranges for the height-balanced histogram of a column, and may update the probabilistic data structures according to the modified bucket range sizes. Alternatively, in some embodiments, histogram generator 420 may be configured to determine new bucket range sizes for a new height-balanced histogram for the data values stored in a given column.

FIG. 4B illustrates an example of a compute node, according to some embodiments. Access requests 452, such as the various queries and messages sent to a leader node, such as leader node 320, and sent from a leader node to a compute node, may be received at compute node 450. A query execution module 460 may process access requests, directing reads, writes, and other access operations to disks 450 through 458. Various different hardware and software devices may be used singly or in combination to implement query execution module 460. When processing queries, query execution module 460 may examine the probabilistic data structure for each data block storing data for the column to determine the data blocks which do not need to be read in order to service the query, and then read the data blocks storing data for the column excepting those data blocks which do not need to be read.

In some embodiments, a compute node 450 may also include a superblock data structure 470, such as the superblock data structure described above, stored locally at the compute node or stored remotely, but accessible to the compute node, which may include respective entries 472 for the data blocks stored on the compute node 450 which store block metadata including probabilistic data structures for the data blocks. Note, however, that in some embodiments metadata for data blocks may be stored in multiple different locations, such as in the data block itself, or in other individual data structures. Therefore, the superblock data structure 470 is not intended to be limiting as to the various other structures, locations, methods, or techniques which might be applied to preserve metadata information for the data block.

As noted above, FIGS. 2 through 4 illustrate example embodiments of processing queries using histograms for a column of a columnar database table and are not intended to be limiting as to other architectures, systems, components, or arrangements that may be used for storing and managing a columnar database table. For example, the distributed data warehouse cluster 300 described above with regard to FIG. 3 may not include a leader node, or may include one or more other different nodes performing different functions for the storage and management of data.

Workflow of Processing Queries Using a Height-Balanced Histogram

Figure 5:
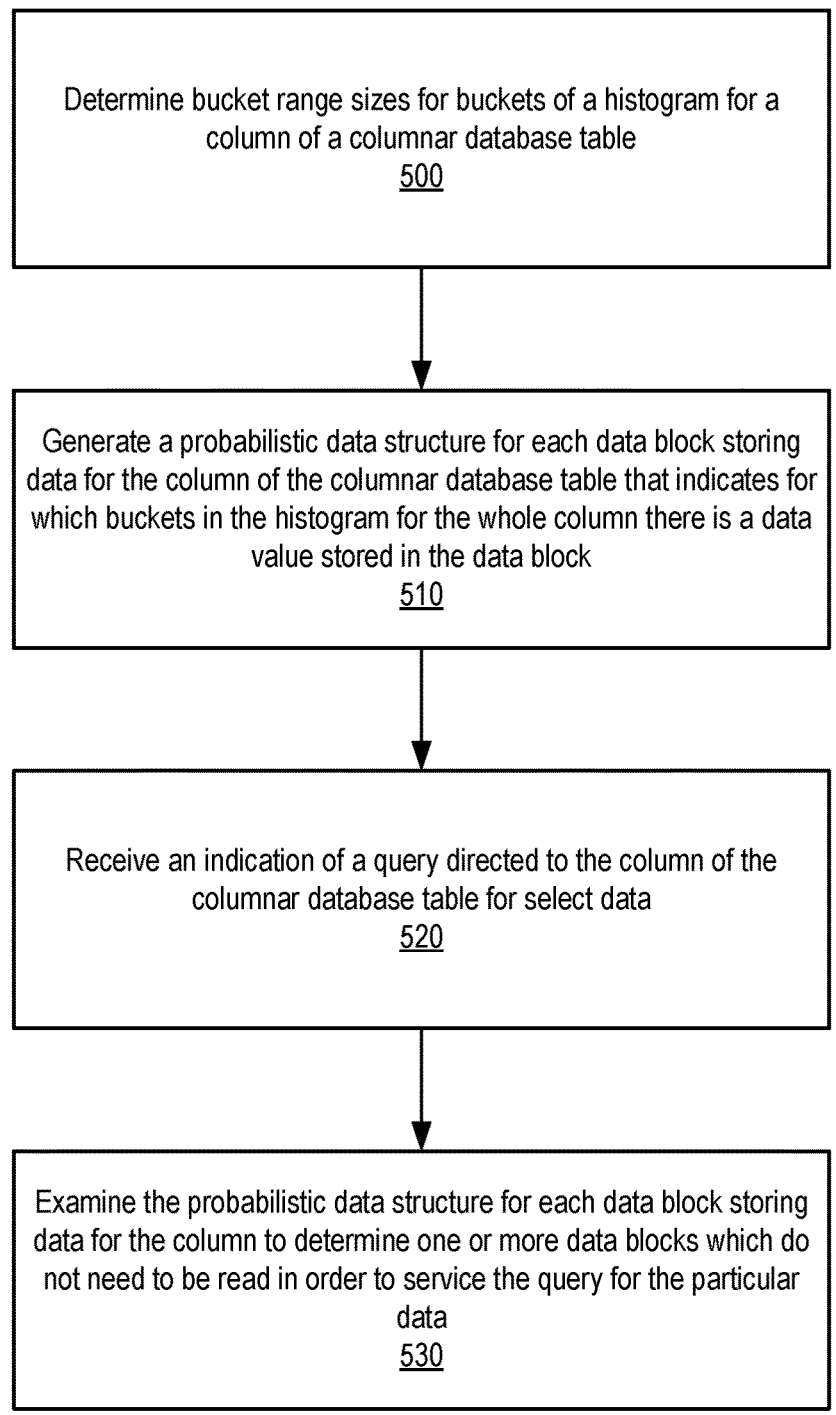
FIG. 5 is a high-level flowchart illustrating a method to process queries using a histogram for a column of a columnar database table, according to some embodiments.

As has been discussed above, database management systems may be configured to utilize columnar database tables to provide more efficient data management functions. In order to more efficiently perform these functions, probabilistic data structures may be generated for data blocks storing data for a column in a columnar database table based on a histogram of the data in the column. In at least some embodiments, this histogram is a height-balanced histogram. FIG. 5 is a high-level flowchart illustrating a method to determine bucket range sizes for a histogram representing a distribution of data for a column in a columnar database table, according to some embodiments. Various different systems and devices may implement the various methods and techniques described below. A histogram generator, such as histogram generator 420 described above with regard to FIG. 4, may work together with a query execution module, such as query execution module 460, to implement the various methods. Alternatively, a combination of different systems and devices, such as the multiple compute nodes illustrated in FIG. 3 working together, for example, may also perform the below method and techniques. Therefore, the above examples and or any other systems or devices referenced as performing the illustrated method, are not intended to be limiting as to other different individuals or configurations of systems and devices.

Figure 6:
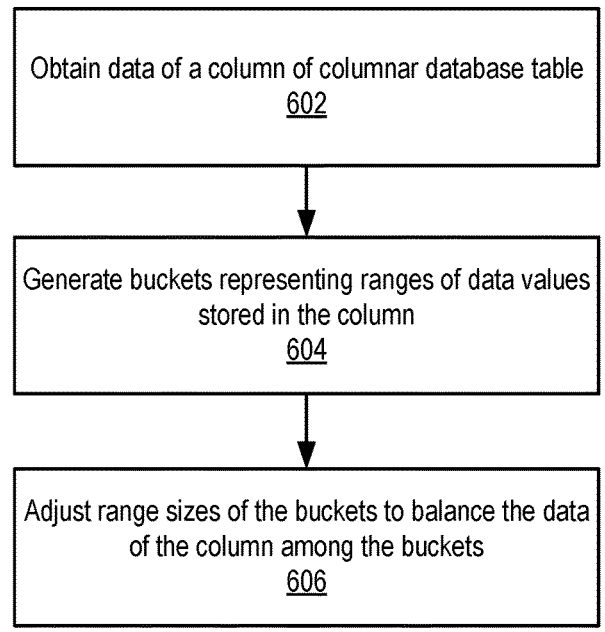
FIG. 6 is a high-level flowchart illustrating a method to determine bucket range sizes for a histogram representing an even distribution of data for a column in a columnar database table, according to some embodiments.

In various embodiments, bucket range sizes for buckets of a histogram for a column of a columnar database table may be determined, as indicated at 500. As discussed above, a histogram represents the distribution of data across ranges of values, often called "buckets." Typically, these buckets may be sized equally. For example, if histogram were generated for number of software application downloads based on the amount of time spent using an application demo, the buckets might have range sizes of 10 minute intervals up to 2 hours. However, a histogram, such as a height-balanced histogram, of the data values may determine that some buckets should be 5 minute intervals and some should be 30 min intervals, to evenly distribute the number of downloads in each bucket. FIG. 6 illustrates one such method to determine bucket range sizes for a histogram representing an even distribution of data for a column in a columnar database table, according to some embodiments.

As indicated at 602, the data of the column which the histogram represents may be obtained. As noted above, in some embodiments a single node, storage device, may physically store all of the data blocks for a particular column in one location. However, in at least some other embodiments, though data blocks may be logically grouped as data blocks storing data for a particular column of a columnar database table, the data blocks themselves may be physically distributed across multiple locations on several different devices, such as the multiple compute nodes in the distributed data warehouse cluster described above with regard to FIG. 3. Thus, in some instances the data may be obtained from multiple devices or systems before further calculations are performed.

A number of buckets may then be generated which represent ranges of data values stored in a data block, as indicated at 604. The particular number of buckets may be determined based on the number of data values that may be stored in a data block. In some embodiments, the number of buckets generated may be significantly more than the number of data values that may be stored. For instance, the number of buckets for the histogram may be determined based on a particular factor (or multiple) of the number of data values that may be stored in a data block. Thus, if a data block may store 100 data values, then the number of buckets generated for the histogram representing the column may be increased by a factor of 10 to 1,000 buckets. Selectivity (the accuracy) with which a probabilistic data structure is generated based on the number of buckets, may depend on a larger or more significant difference between the number of buckets and the number of data values that may be stored in a data block. However, this need not be limiting as other possible embodiments may determine a number of buckets to be generated according to alternative criteria, such as the type of data stored in the column (e.g., name, data, number, product number, etc.) or the type of query typically directed to the data (e.g., a range query).

The range sizes of the buckets may then be adjusted to balance the data of the column among the buckets for the height-balanced histogram, as indicated at 606. Please note, that the term "evenly" or "balance" as used in this specification is not limited to nor intended to mean "exactly the same values." Near balance, approximate balance, or even an estimated balance among the buckets for a histogram may provide for similar selectivity, and as such the terms are not to be restricted to one particular meaning.

Figure 7:
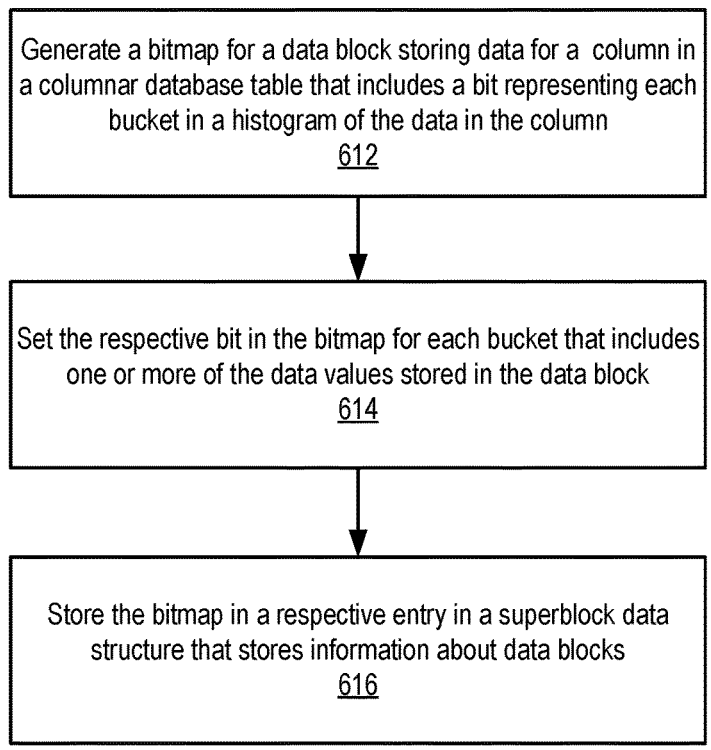
FIG. 7 is a high-level flowchart illustrating a method to generate a bitmap representing each bucket in a histogram of the data in a column of a columnar database table, according to some embodiments.

Upon determining the bucket range sizes for buckets of a histogram, a probabilistic data structure may be generated for each data block storing data for the column of the columnar database table, as indicated at 510. As noted above, a probabilistic data structure may indicate whether a given value is a member of a set of data, such as the data stored in a data block. A probabilistic data structure may indicate for which buckets in the height-balanced histogram for the whole column there is a data value stored in the data block. In at least some embodiments, the probabilistic data structure may be a bitmap. FIG. 7 illustrates a flowchart of a method to generate a bitmap representing each bucket in a histogram of the data in a column of a columnar database table, according to some embodiments.

A bitmap for a data block storing data for a column in a columnar database table may be generated, as indicated at 612. The number of bits in the bitmap may correspond to the number buckets in the histogram. Each bit may represent a bucket in the histogram representing the distribution of data in the column. For example, as illustrated in FIG. 1, the 8 buckets illustrated with the histogram correspond to the 8 bits in the bitmap stored in superblock 100. Once created, each data value stored in a data block may be located within one of the buckets for the height-balanced histogram. The respective bit for the bucket that includes the data value within the range of values for the bucket is set (e.g., set to a value of "1"), as indicated at 614. Once all of the data values have been located in the buckets of the histogram and the corresponding bits for buckets that contain data values in the bucket have been set, the bitmap may be stored in block metadata. As indicated at 616, in some embodiments, the bitmap may be stored in a respective entry of a superblock, such as superblock 470 described above with regard to FIG. 4B.

In various embodiments, a query, or an indication of a query, may be received that is directed to the column of the columnar database table for select data, as indicated at 520. As discussed above with regard to FIGS. 2 through 4B, a query or other access request message may be formatted according to a variety of different standardized query protocols or languages, such as SQL, or a customized format, such as described in an API. In at least some embodiments, the query may be one or more queries directed to a compute node, such as compute node 450 described above with regard to FIG. 4B, from a leader node, such as leader node 400 described above with regard to FIG. 4A. In response to receiving the query, the probabilistic data structure for each data block storing data in the column may be examined, as indicated at 530. The examination of a probabilistic data structure may determine particular data blocks which do not need to be read in order to service the query for the select data.

Figure 8:
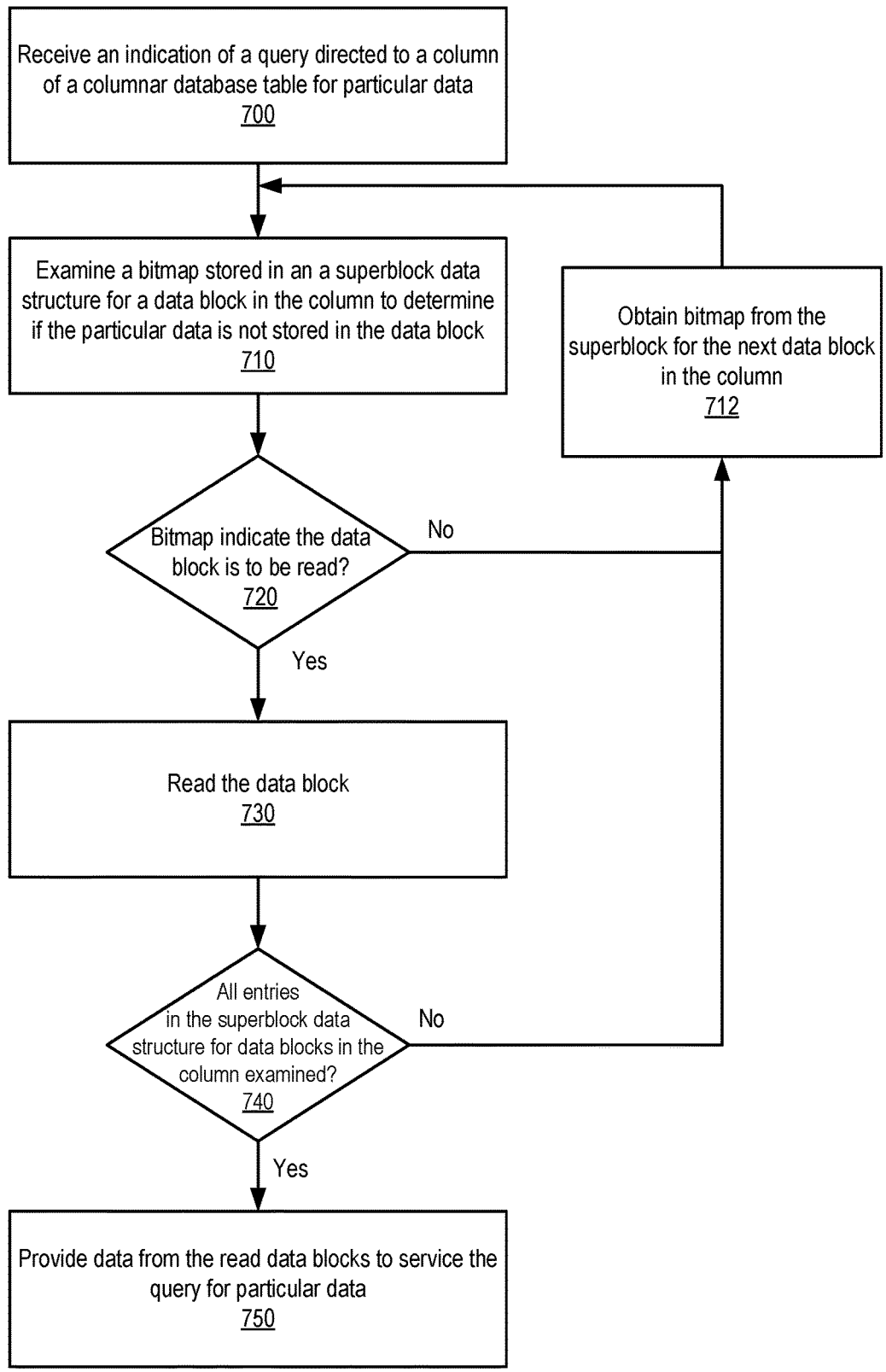
FIG. 8 illustrates a flow chart of a method to determine which data blocks do not need to be read in response to a query for data in a column of a columnar database table, according to some embodiments.

FIG. 8 illustrates a flowchart of a method to determine which data blocks do not need to be read in response to a query for data in a column of a columnar database table, according to some embodiments. As indicated at 700, an indication of a query directed to a column of a columnar database table for selected data may be received. The query may contain a request for particular data, such as a range of data values (e.g., data between certain dates, data associated with certain purchase order amounts, etc.). The data values of the select data may then be located within a bucket of the histogram for the column that the query is directed to. Once identified, the probabilistic data structure, such as the bitmap, may be obtained from block metadata, such as a superblock, and examined to determine if the particular data is not stored in the data block, as indicated at 710. If the corresponding bits of the bitmap for the bucket locations of the data values in the select data are not set, then the bitmap indicates that the data block does not need to be read, as indicated at 720. For example, looking back at FIG. 1, the first bitmap stored in superblock 100 has 8 bit values, "1 0 0 1 0 1 1 0" which correspond to the buckets for the histogram 120. If the first bucket represents data values 1 through 10, and the second bucket represents values 11 through 30, then for a selected data value of 20, the bit corresponding to the second bucket will be examined. In this case, the bit is set to 0, indicating that there are no data values in the range from 11 to 30 stored in the corresponding data block in column 132. Thus, the bitmap would indicate that the first data block need not be read if the select data value is 20. However, if there is a select data value of 5, then the corresponding bit for the first bucket is set to 1, indicating that a value of 1 to 10 may be stored in the data block. Thus, the bitmap would indicate that data block may store the data value, as indicated at 720. As a result, the data block may be read, as indicated at 730.

As FIG. 8 illustrates, this process may be repeated until all of the block metadata, such as the respective entries for the data blocks in the superblock, have been examined for all of the data blocks storing data for the column, as indicated at 740. For example, both "No" branches point to element 712 which indicates that a bitmap for the next data block in the column may be obtained from the super block. The data read from the data blocks may then be provided to service the equerry for the select data, as indicated at 750. Note that because the data block is read does not indicate the select data must be in the data block, but instead indicates that the data may be stored in the data block. Further filtering, processing, or other query operations may be performed upon the data read from the data block. At least some of the data may be returned to a leader node, storage client, or other system or device.

As data operations are performed on the data in a column, such as the addition or modification of data values, the probabilistic data structure for a data block in a column may not remain current. For example, in some embodiments additional data for the column may be received and stored in new data blocks. When the new data is stored, a probabilistic data structure may be generated for the new data block, such as by setting the bits in a bitmap corresponding to the buckets in the previously created height-balanced histogram for the new data values. Over time, this may skew the histogram, causing the histogram to become less height-balanced or have less evenly distributed column data among the buckets. For some embodiments implementing a height-balanced histogram, this additional data may reduce the efficiency of using the height-balanced histogram. As a remedy, in at least some embodiments, a new height-balanced histogram for the current data stored in a column of a columnar database table may be calculated, with bucket range sizes determined and new probabilistic data structures generated for each the data blocks storing data for the column. However, this operation may prove expensive in terms of computational resources. Therefore, in at least some embodiments, the bucket ranges themselves may be modified without recalculating the distribution of the data of the column to include the new or modified data in the column.

Figure 9:
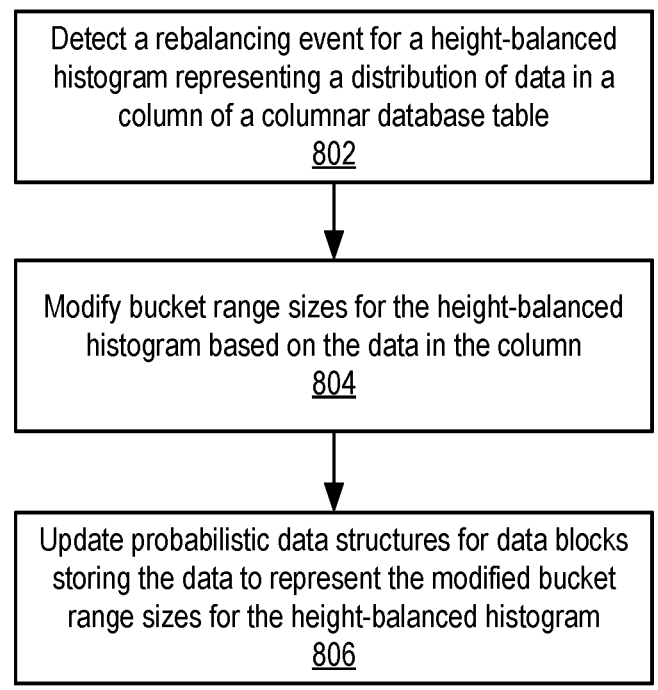
FIG. 9 illustrates a flow chart of a method to modify a probabilistic data structure for a data block in response to detecting a rebalancing event, according to some embodiments.

FIG. 9 illustrates a flow chart of a method to modify a probabilistic data structure for a data block in response to detecting a rebalancing event, according to some embodiments. As indicated at 802, a rebalancing event may be detected. For example, a histogram generator, such as histogram generator 420 discussed above with regard to FIG. 4A, may detect that a certain amount of time has passed since the last calculation or modification of a height-balanced histogram for the column, exceeding a rebalance time threshold (e.g., 24 hours). Other embodiments may determine that an amount of additional data stored in additional data blocks may have been stored for a column, exceeding a rebalancing threshold. For example, a rebalancing threshold may be 20 new data blocks for a column, and after writing more than 20 data blocks for the column, a rebalancing event may be detected.

In at least some embodiments, a rebalancing event may be determined based on the distribution of additional data for a column. This additional data may be analyzed to determine a change in the distribution of the additional data, such as the distribution of the additional data among the buckets of the height-balanced histogram, compared to the current distribution of data in the column. It may then be determined whether the change exceeds a distribution threshold, such as a certain percentage or other value that indicates the distribution of the additional data may be skewed toward a different distribution than the current histogram, such as the distribution for the histogram may no longer be height-balanced.

Analyzing the distribution for additional data may be performed in a variety of different ways. Analysis of the data values of the additional data may be performed to analyze the distribution of the additional data either as the additional data is stored in additional data blocks, or after the additional data is stored in the additional data blocks. For instance, the distribution of data values for data may be tracked or monitored during the store process by examining the data values for each data block prior to storage. Alternatively, after a certain number of additional data blocks have been stored, the data values may be obtained and analyzed.

In addition to analyzing the data values of the additional data, in at least some embodiments the probabilistic data structures, such as the bitmaps, generated for the additional data may be examined instead. For example, as discussed above a bitmap may be generated which indicates which buckets of a histogram include data values of the additional data in an additional data block. These bitmaps may be analyzed to determine the distribution of the additional data. The number of bits set, for instance, which indicate a data value within the bucket range may be counted or tracked. This tracking may be maintained as each additional bitmap is generated for additional data blocks storing additional data (or alternatively, may be obtained after the bitmaps are generated and the additional data stored in the data blocks). Based on the number of buckets set for the additional data, such as those with the same buckets set or buckets close in range set, a distribution of the additional data may be determined. The change compared to the original distribution of the data in the column may then be determined. If, for instance, the number of bits set representing a particular bucket range for additional data blocks exceeds a certain threshold, (e.g., a count value relative to the number of additional data blocks stored, such as a threshold of 20 relative to 30 additional data blocks stored) then it may be determined that the distribution of data for the additional data is skewed toward that particular bucket range when compared to the previous distribution of data for the column. A rebalancing event may be triggered. Such an analysis may also be performed for one or more of the other buckets of the histogram. The results for individual buckets may, for instance, be combined to determine a distribution for the additional data, which may then be compared to the distribution of the data prior to the additional data. If this change exceeds some distribution threshold, then the rebalancing event may be triggered.

Figure 10:
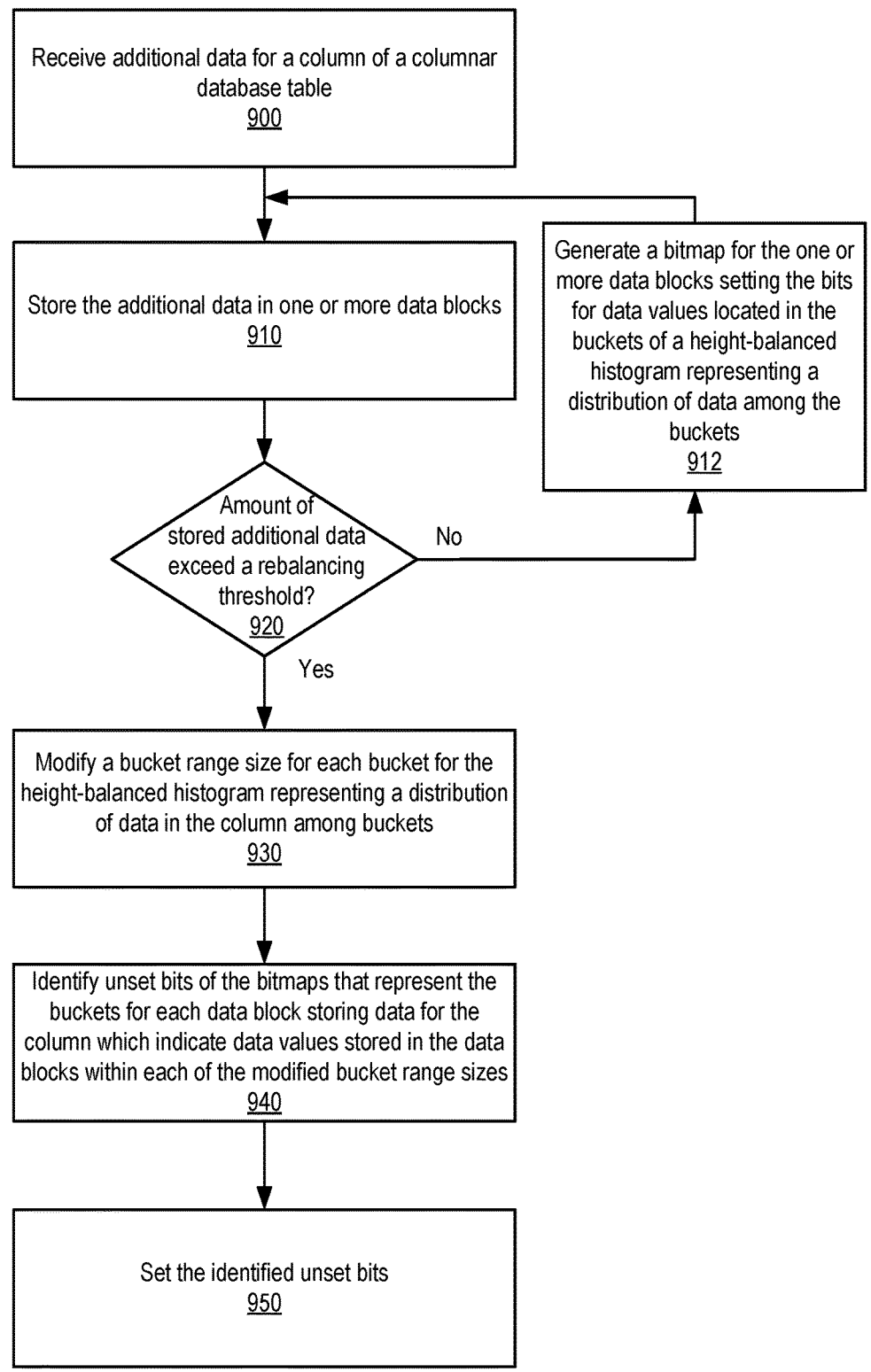
FIG. 10 illustrates a flow chart of a method to update a probabilistic data structure for a data block, according to some embodiments.

In response to detecting a rebalancing event for the height-balanced histogram representing the data of the column, the bucket range sizes for the height-balanced histogram may be modified, as indicated at 804. Modifying the bucket range sizes could be performed according to many different bucket range techniques, such as by examining the probabilistic data structures for the additional data blocks to estimate the distribution of the additional data. For example, if new data added to the column skews to higher range values, then the distribution may be estimated to decrease the size of buckets representing the higher range values. Alternatively, the bucket range sizes may be modified to overlap, such as by setting bits adjacent to set bits in a bitmap probabilistic data structure. Once the bucket range sizes for the height-balanced histogram representing the distribution of data for the column are modified, then the probabilistic data structures for the data blocks may be updated to represent the modified bucket range sizes for the height-balanced histogram, as indicated at 806. FIG. 10, discussed further below, describes an example of a technique to update probabilistic data structures. Such updates may, for example, be as simple as setting different bits in those probabilistic data structures that are represented as bitmaps, or changing to a different probabilistic data structure representing the distribution of the data among the buckets according to the modified bucket range sizes. For example, a height-balanced histogram may instead be represented as a mathematical expression rather than a bitmap. Alternatively, updates may include generating a new block metadata structure, such as a superblock, filled with the updated probabilistic data structures to replace a current block metadata structure that is used for servicing queries for the data of the column. The current superblock data structure is utilized until the new superblock data structure has been completed.

FIG. 10 illustrates a flow chart of a method to update a probabilistic data structure for a data block, according to some embodiments. As indicated at 900, additional data for a column of a columnar database table may be received. The data may be stored in one or more data blocks, as indicated at 910. The amount of data stored, such as the number of data blocks created, may exceed a rebalancing threshold, such as one of the various thresholds used to trigger a rebalancing event discussed above with regard to FIG. 9, as indicated at 920. If not, then generate a bitmap for the one or more data blocks setting the bits for data values located in the buckets of a height-balanced histogram representing a distribution of data among the buckets, as indicated at 912. If the rebalancing threshold is exceeded, then modify a bucket range size for each bucket for the height-balanced histogram representing the distribution of data in the column among the buckets, as indicated at 930. Then, the unset bits of the bitmaps that represent the buckets for the data blocks in the column which are now indicated to store data values within the modified bucket range sites are identified, as indicated at 940, and then set, as indicated at 950.

In various embodiments, updated probabilistic data structures due to modified bucket range sizes may be further updated after subsequent reads of the data blocks which correspond to the data structure. For example, if a probabilistic data structure indicates that a data value within a certain range of values is stored in the data block, and after reading the data block it is determined that no such value is within the range, the probabilistic data structure may be updated to indicate that the value is not stored within the range. Looking again back at FIG. 1, if, for instance, bucket 8 has been changed to a modified bucket range size even larger than before, and the superblock 100 bitmap for the first data block is updated to indicate that bit 8 is now set to 1 instead of 0 (indicating a value stored with the range of modified values represented by bucket 8), and then the data block is read and no data value is actually stored in the modified range as indicated by the 1 in bit 8, then the bitmap may be further updated to return the bit to 0.

In at least some embodiments, the selectivity level of the probabilistic data structures for the data blocks may be determined. If, for example, most of the bits of the data bitmap are set to 1, then the bitmap is not highly selective as most examinations will indicate that the data block should be read. If the selectivity level falls below a selectivity threshold, then, in some embodiments a different probabilistic data structure, such as a bloom filter, quotient filter, or skip list may be implemented in place of the height-balanced histogram and stored in the block metadata to facilitate query processing.

Example System

Embodiments of efficient query processing using a histogram for a column of a columnar database as described herein may be executed on one or more computer systems, which may interact with various other devices. One such computer system is illustrated by FIG. 11. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for scaling computing clusters in distributed systems as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 11:
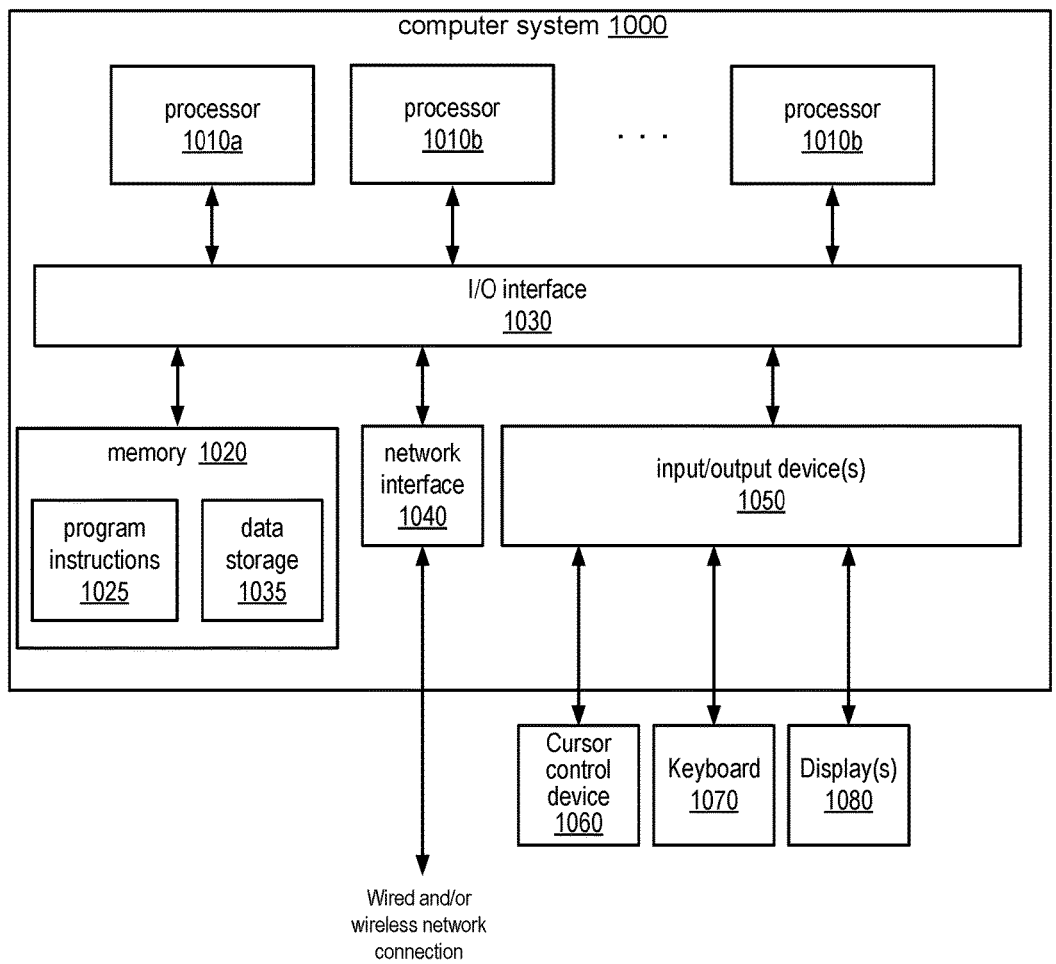
FIG. 11 illustrates an example system, according to some embodiments.

As shown in FIG. 11, memory 1020 may include program instructions 1025, configured to provide time-based item recommendations for a scheduled delivery orders as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more hardware processors and memory with program instructions to:
determine a bucket range size for each of a plurality of buckets for a histogram of a column of a columnar database table, wherein each bucket of the plurality of buckets represents an existence of one or more data values of the data in the column within a range of values according to the determined bucket range size;
generate a probabilistic data structure for each of one or more data blocks storing data for the column of the columnar database table, wherein the probabilistic data structure indicates for which particular buckets of the plurality of buckets in the histogram there is a data value stored in the data block; and
examine the probabilistic data structure, responsive to a query, for each of the one or more data blocks storing data for the column to determine ones of the one or more data blocks which do not need to be read in order to service the query.

2. The system of claim 1, wherein to determine the plurality of bucket range sizes for the histogram of the column of the columnar database table, the program instructions are executable to:
obtain the data of the column;
generate the plurality of buckets; and
set a bucket range size of the plurality of bucket range sizes for each bucket for the histogram such that the data of the column is evenly distributed among the buckets.

3. The system of claim 1, wherein the probabilistic data structure is a bitmap comprising a plurality of bits, wherein each bit of the bitmap represents each bucket of the plurality of buckets for the histogram, and for every data value included in the bucket range size stored in the data block the bit of the bitmap corresponding to the bucket is set.

4. The system of claim 1, wherein the program instructions are executable to store the probabilistic data structure of each of the one or more data blocks in a respective entry in a block metadata structure that stores information about the one or more data blocks.

5. The system of claim 1, further comprising at least one compute node as a leader node of a distributed data warehouse cluster.

6. The system of claim 1, wherein the histogram of the column of the columnar database table is a height-balanced histogram.

7. The system of claim 6, the program instructions are executable to:
detect a rebalancing event for the distribution of data in the column among the plurality of buckets;
in response to detecting the rebalancing event:
modify the bucket range size for each of the plurality of buckets for the height-balanced histogram of the column; and
update each probabilistic data structure for each of the one or more data blocks according to the modified bucket range size of the plurality of buckets.

8. A method, comprising:
performing, by one or more computing devices comprising one or more hardware processors and memory:
determining a bucket range size for each of a plurality of buckets for a histogram of a column of a columnar database table, wherein each bucket of the plurality of buckets represents an existence of one or more data values of the data in the column within a range of values according to the determined bucket range size;
generating a probabilistic data structure for each of one or more data blocks storing data for the column of the columnar database table, wherein the probabilistic data structure indicates for which particular buckets of the plurality of buckets in the histogram there is a data value stored in the data block; and
examining the probabilistic data structure, responsive to a query, for each of the one or more data blocks storing data for the column to determine ones of the one or more data blocks which do not need to be read in order to service the query.

9. The method of claim 8, wherein said determining a bucket range size for each of a plurality of buckets for the histogram of the column of the columnar database table comprises:
obtaining the data of the column;
generating the plurality of buckets; and
setting a bucket range size of the plurality of bucket range sizes for each bucket such that the data of the column is evenly distributed among the buckets.

10. The method of claim 8, wherein said generating the probabilistic data structure for each of the one or more data blocks storing data for the column of the columnar database table comprises:
generating a bitmap for the data block comprising a plurality of bits, wherein each bit represents a different bucket of the plurality of buckets for the histogram; and
setting the respective bit in the bitmap for each of the particular buckets for which there is the data value stored in the data block.

11. The method of claim 10, further comprising storing the probabilistic data structure of each of the one or more data blocks in a respective entry in a block metadata structure that stores information about the one or more data blocks.

12. The method of claim 11, wherein said examining the probabilistic data structure for each of the one or more data blocks storing data for the column to determine the particular ones of the one or more data blocks which do not need to be read in order to service the query for the select data comprises:
 determining one or more bits representing the one or more buckets within the range of values including the select data; and
 examining the one or more bits in each bitmap stored in the block metadata structure for the one or more data blocks to identify those data blocks without one of the one or more bits set as the particular ones which do not need to be read in order to service the query for the select data.

13. The method of claim 8, wherein the histogram of the column of the columnar database table is a height-balanced histogram.

14. The method of claim 13, further comprising:
 detecting a rebalancing event for the distribution of data in the column among the plurality of buckets;
 in response to detecting the rebalancing event:
  modifying the bucket range size for each of the plurality of buckets for the height-balanced histogram of the column; and
  updating each probabilistic data structure for each of the one or more data blocks according to the modified bucket range size of the plurality of buckets.

15. A non-transitory, computer-readable storage medium, storing program instructions that when executed by one or more computing devices implement:
 determining a bucket range size for each of a plurality of buckets for a histogram of a column of a columnar database table, wherein each bucket of the plurality of buckets represents an existence of one or more data values of the data in the column within a range of values according to the determined bucket range size;
 generating a probabilistic data structure for each of one or more data blocks storing data for the column of the columnar database table, wherein the probabilistic data structure indicates for which particular buckets of the plurality of buckets in the histogram there is a data value stored in the data block; and
 examining the probabilistic data structure, responsive to a query, for each of the one or more data blocks storing data for the column to determine ones of the one or more data blocks which do not need to be read in order to service the query.

16. The non-transitory, computer-readable storage medium of claim 15, wherein the program instructions when further executed by the one or more computing devices implement:
 obtaining the data of the column;
 generating the plurality of buckets; and
 setting a bucket range size of the plurality of bucket range sizes for each bucket such that the data of the column is evenly distributed among the buckets.

17. The non-transitory, computer-readable storage medium of claim 15, wherein the probabilistic data structure is a bitmap comprising a plurality of bits, wherein each bit of the bitmap represents each bucket of the plurality of buckets for the height-balanced histogram, and for every data value included in the bucket range size stored in the data block the bit of the bitmap corresponding to the bucket is set.

18. The non-transitory, computer-readable storage medium of claim 15, wherein the height-balanced histogram generator is further configured to store the probabilistic data structure of each of the one or more data blocks in a respective entry in a block metadata structure that stores information about the one or more data blocks.

19. The non-transitory, computer-readable storage medium of claim 15, wherein the program instructions when further executed by the one or more computing devices implement a leader node of a distributed data warehouse cluster.

20. The non-transitory, computer-readable storage medium of claim 15, wherein the histogram for the column of the columnar database table is a height-balanced histogram, and wherein the program instructions when further executed by the one or more computing devices implement:
 detecting a rebalancing event for the distribution of data in the column among the plurality of buckets;
 in response to detecting the rebalancing event:
  modifying the bucket range size for each of the plurality of buckets for the height-balanced histogram of the column; and
  updating each probabilistic data structure for each of the one or more data blocks according to the modified bucket range size of the plurality of buckets.

* * * * *